US009393654B2

(12) United States Patent
Chen et al.

(10) Patent No.: US 9,393,654 B2
(45) Date of Patent: Jul. 19, 2016

(54) INSTANT CLAMPING MECHANISM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jia-Chao Chen, Shenzhen (CN); Yun-Tao Zhang, Shenzhen (CN); Xiao-Bing Xu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 306 days.

(21) Appl. No.: 14/014,811

(22) Filed: Aug. 30, 2013

(65) Prior Publication Data

US 2014/0117605 A1  May 1, 2014

(30) Foreign Application Priority Data

Oct. 29, 2012 (CN) .......................... 2012 1 0419975

(51) Int. Cl.
*B23Q 3/06* (2006.01)
*B23Q 1/00* (2006.01)

(52) U.S. Cl.
CPC ................ *B23Q 1/0081* (2013.01); *B23Q 3/06* (2013.01)

(58) Field of Classification Search
CPC ........ B23Q 1/0081; B23Q 3/06; B23B 31/06; B23B 31/1071; B23B 31/1077
USPC ...................... 269/6, 165, 24–27, 289 R–291
See application file for complete search history.

(56) References Cited

U.S. PATENT DOCUMENTS

| 3,741,573 | A | * | 6/1973 | Treer | ...................... | B23B 31/06 |
| | | | | | | 219/69.15 |
| 4,813,829 | A | * | 3/1989 | Koppelmann | ...... | B23B 31/1077 |
| | | | | | | 279/81 |
| 5,417,409 | A | * | 5/1995 | Reddell | ................... | B25B 1/125 |
| | | | | | | 269/100 |
| 6,623,015 | B2 | * | 9/2003 | Schill | ................. | B23B 31/1071 |
| | | | | | | 219/69.15 |
| 6,957,808 | B2 | * | 10/2005 | Varzino | .................... | B25B 1/08 |
| | | | | | | 269/170 |
| 7,044,462 | B2 | * | 5/2006 | Iwata | ....................... | B23Q 3/06 |
| | | | | | | 269/157 |
| 7,338,599 | B2 | * | 3/2008 | Hiranga | ................ | B01D 29/15 |
| | | | | | | 210/232 |

FOREIGN PATENT DOCUMENTS

| CN | 101337340 A | 1/2009 |
| CN | 102233537 A | 11/2011 |
| TW | 201237284 A1 | 9/2012 |

* cited by examiner

*Primary Examiner* — Joseph J Hail
*Assistant Examiner* — J Stephen Taylor
(74) *Attorney, Agent, or Firm* — ScienBiziP, P.C.

(57) ABSTRACT

An instant clamping mechanism includes a supporting member, a base seat, a clamping assembly and a handle assembly. The base seat is assembled to the supporting member and defines a sliding groove, the sliding groove includes a releasing end and a latching end, an axial distance within the base seat is defined from the latching end to the releasing end. The clamping assembly extends through the base seat and the supporting member and is partially exposed out from the supporting member. The handle assembly extends into the sliding groove and is partially exposed out from the base seat. The handle assembly is non-rotatably connected to the clamping assembly and is capable of sliding from the releasing end to the latching end to move the clamping assembly axially within the base seat, thereby clamping the workpiece on the supporting member.

20 Claims, 6 Drawing Sheets

INSTANT CLAMPING MECHANISM

BACKGROUND

1. Technical Field

The present disclosure relates to a clamping mechanism, and more particularly, to an instant clamping mechanism.

2. Description of Related Art

In industrial manufacturing, workpieces are required to be stably clamped in a plurality of machining processes. A nut and a screw rod are commonly employed to clamp the workpieces. When releasing the workpiece after clamping, the nut is rotated to disengage from the screw rod. It is inconvenient and the efficiency is relatively low.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
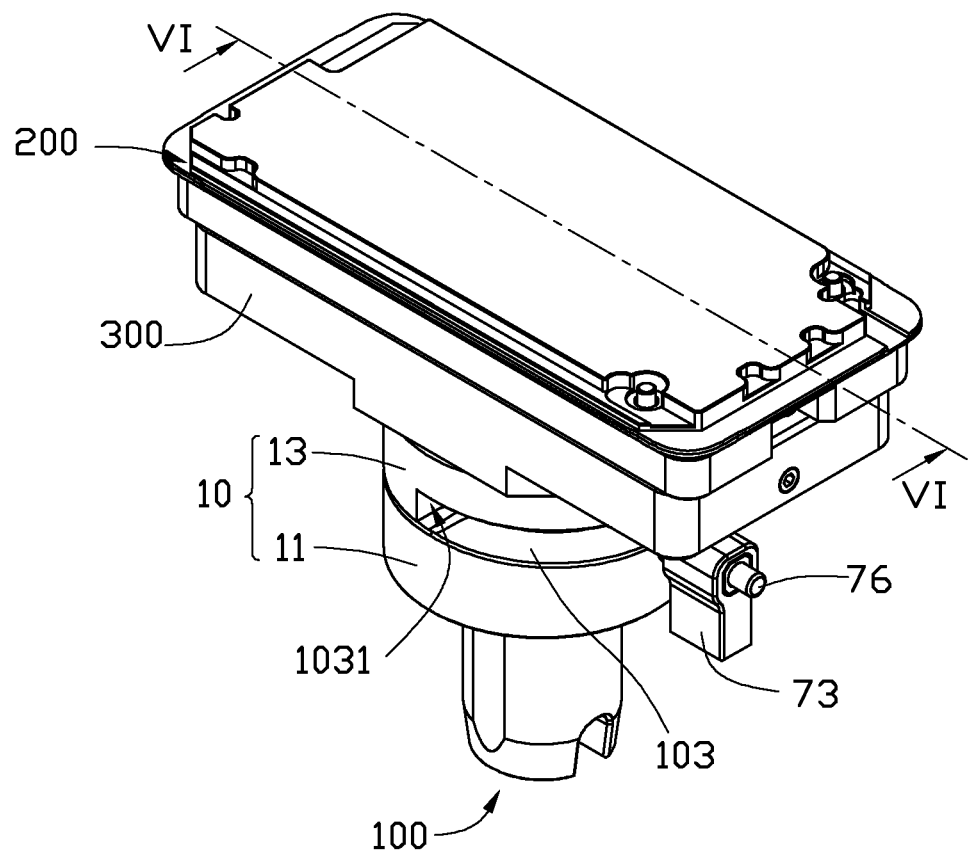
FIG. 1 is an isometric view of an embodiment of an instant clamping mechanism clamping a workpiece.
Figure 2:
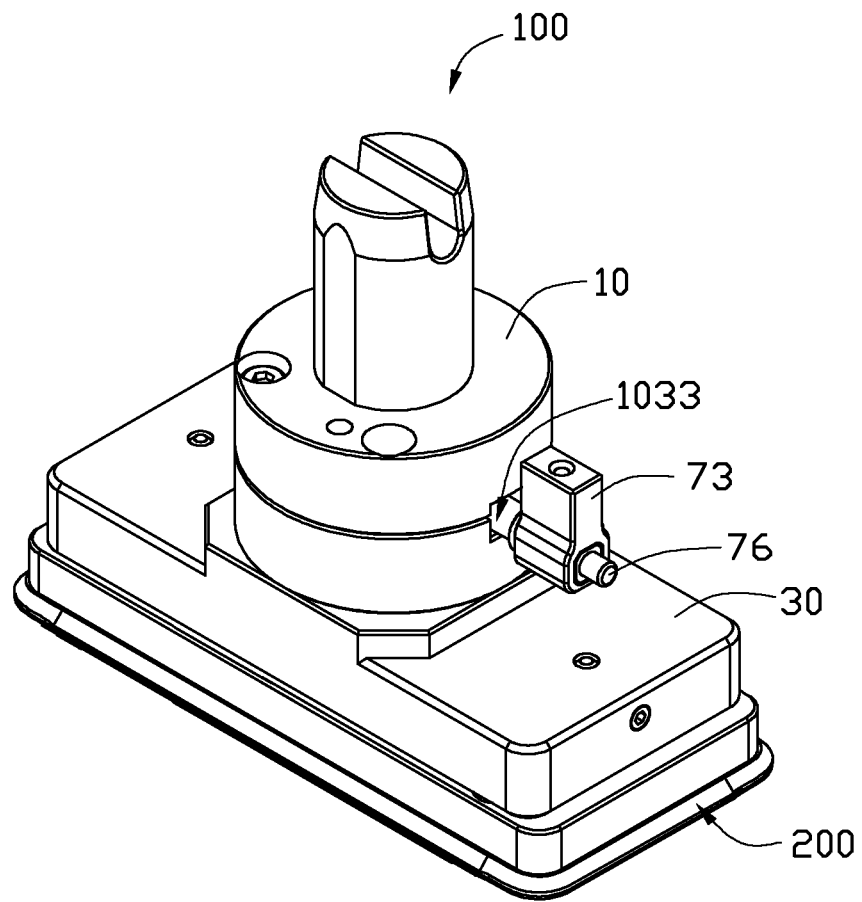
FIG. 2 is similar to FIG. 1, but viewed from another aspect.
Figure 3:
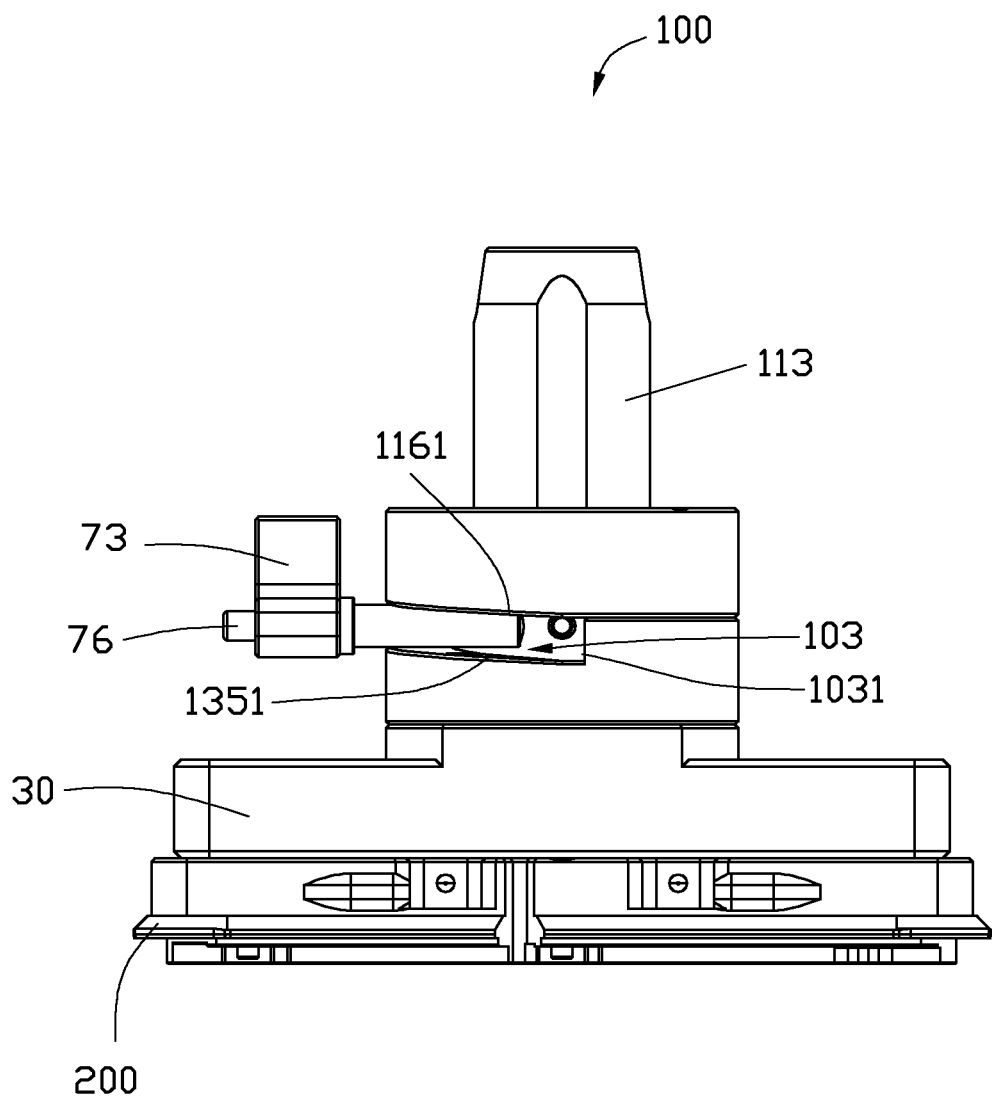
FIG. 3 is a side view of the instant clamping mechanism of FIG. 1 clamping a workpiece.
Figure 4:
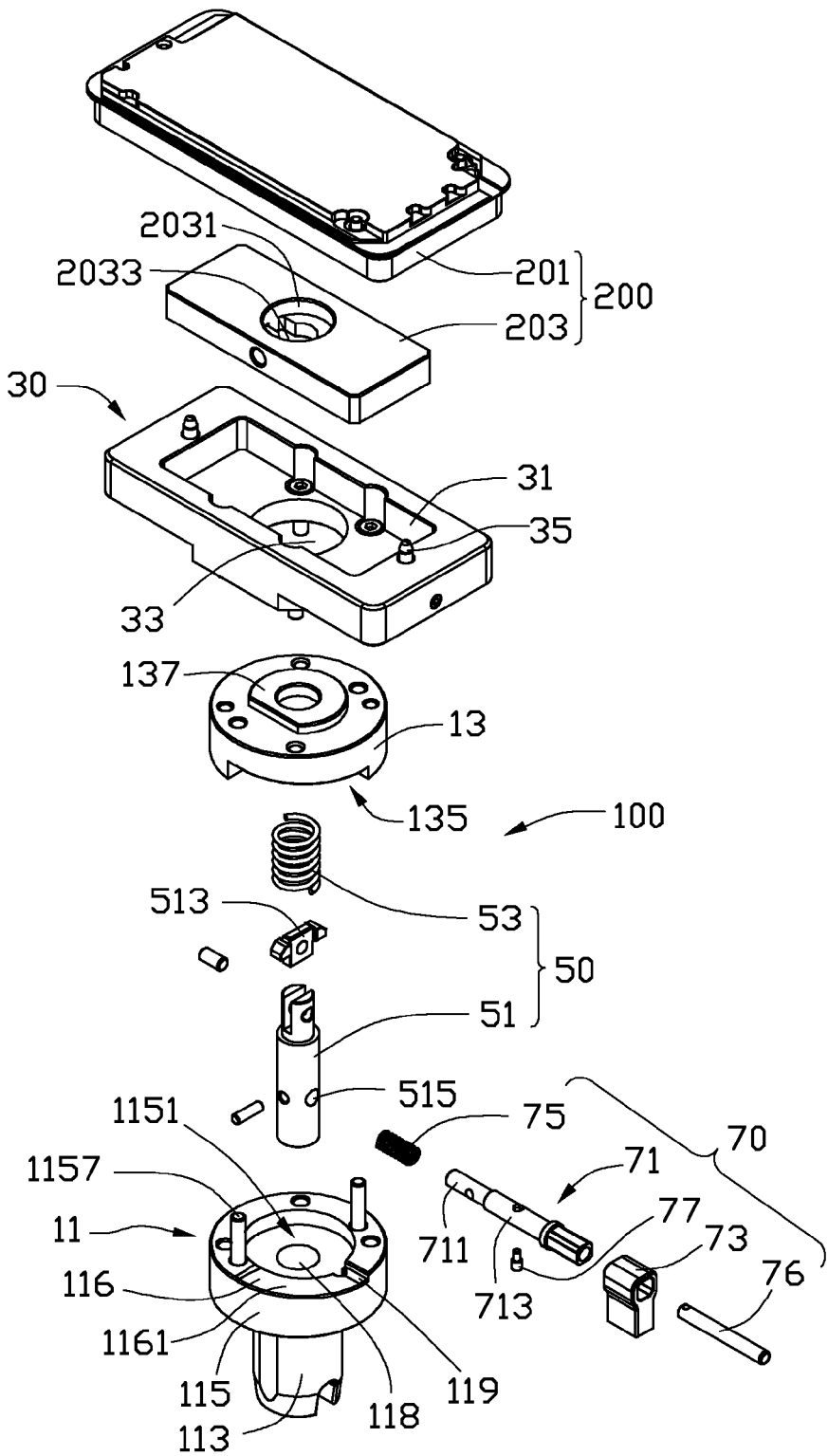
FIG. 4 is an exploded, isometric view of the instant clamping mechanism of FIG. 1 with a workpiece.
Figure 5:
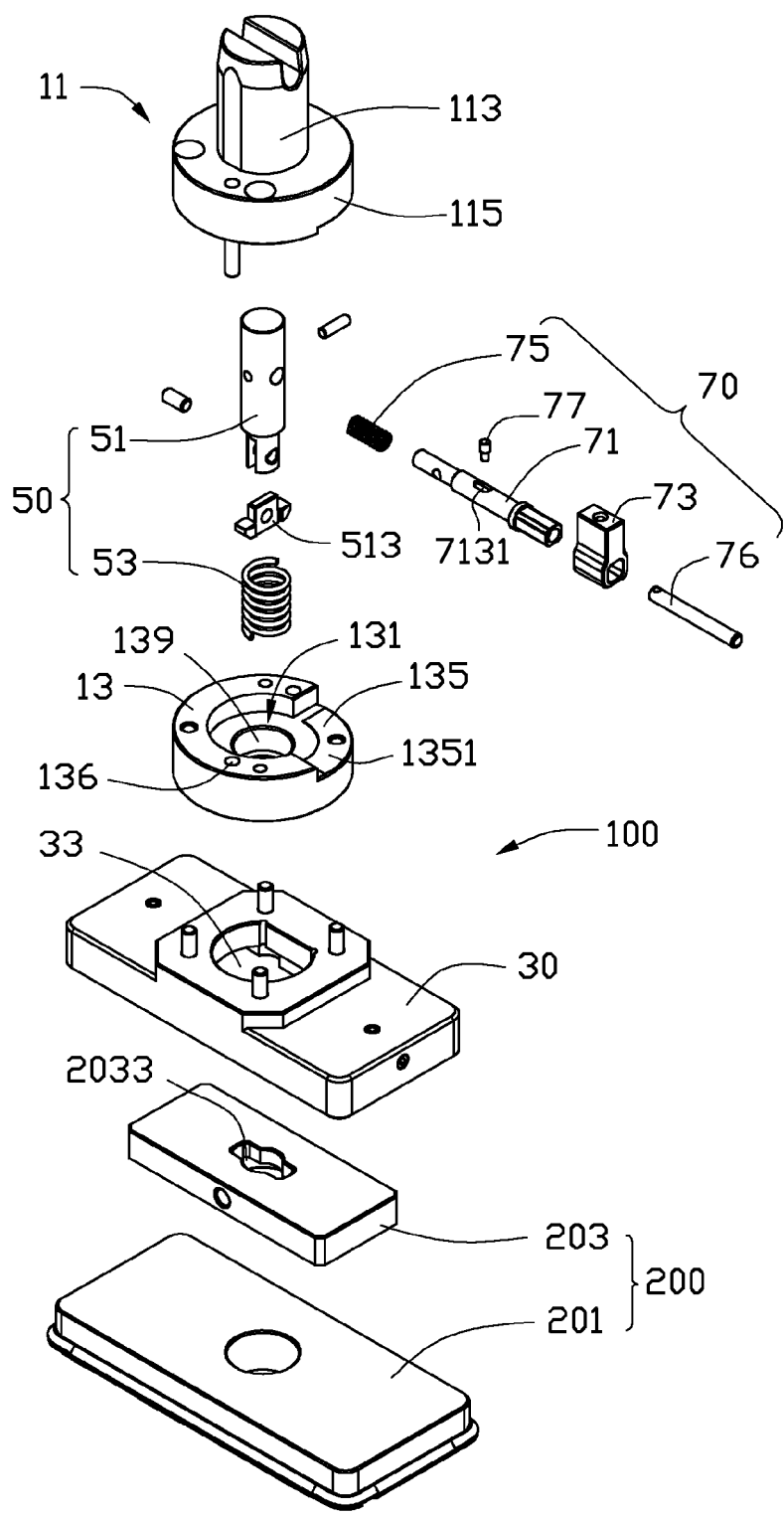
FIG. 5 is similar to FIG. 3, but viewed from another aspect.

FIGS. 1 through 5 show an embodiment of an instant clamping mechanism 100 for positioning a workpiece 200 to be machined on a machine support (not shown). The instant clamping mechanism 100 includes a base seat 10, a supporting member 30, a clamping assembly 50, and a handle assembly 70. The base seat 10 is fixed to the machine support and defines a sliding groove 103 along a peripheral surface thereof. The supporting member 30 is fixed to the base seat 10. The clamping assembly 50 extends through the base seat 10 and the supporting member 30, and protrudes from the supporting member 30 to position the workpiece 200. The handle assembly 70 is inserted into the sliding groove 103 and is non-rotatably connected to the clamping assembly 50. The handle assembly 70 slides along the sliding groove 103 and rotates the clamping assembly 50 to enable the clamping assembly 50 to move axially in the base seat 10, thereby clamping or releasing the workpiece 200.

The base seat 10 includes a seating body 11 and a cover 13 assembled to the seating body 11. The seating body 11 includes a first fixing portion 113 and a second fixing portion 115. The first fixing portion 113 is in the shape of a post and fixed to the machine support. The second fixing portion 115 is in a disk shape and coaxially connected to an end of the first fixing portion 113. The second fixing portion 115 has a diameter greater than that of the first fixing portion 113. The second fixing portion 115 defines a first receiving groove 1151, a first guiding groove 116, and an inserting hole 118 on an end thereof away from the first fixing portion 113. The first receiving groove 1151 is located at a middle of the end of the second fixing portion 115; the first guiding groove 116 is defined along a periphery of that end of the second fixing portion 115 and communicates with the first receiving groove 1151. The inserting hole 118 is defined in a bottom of the first receiving groove 1151 and extends into the first fixing portion 113. The second fixing portion 115 further includes a pair of posts 1157 symmetrically arranged at a periphery thereof. The first guiding groove 116 is recessed from the periphery of the second fixing portion 115 and located between the pair of posts 1157. A central angle of the second fixing portion 115 subtended by the first guiding groove 116 is about 90 degrees. The first guiding groove 116 defines a first inclining surface 1161 at a bottom thereof, and defines a latching groove 119 at an end of the first inclining surfaced 1161. The latching groove 119 communicates with the first receiving groove 1151.

Figure 6:
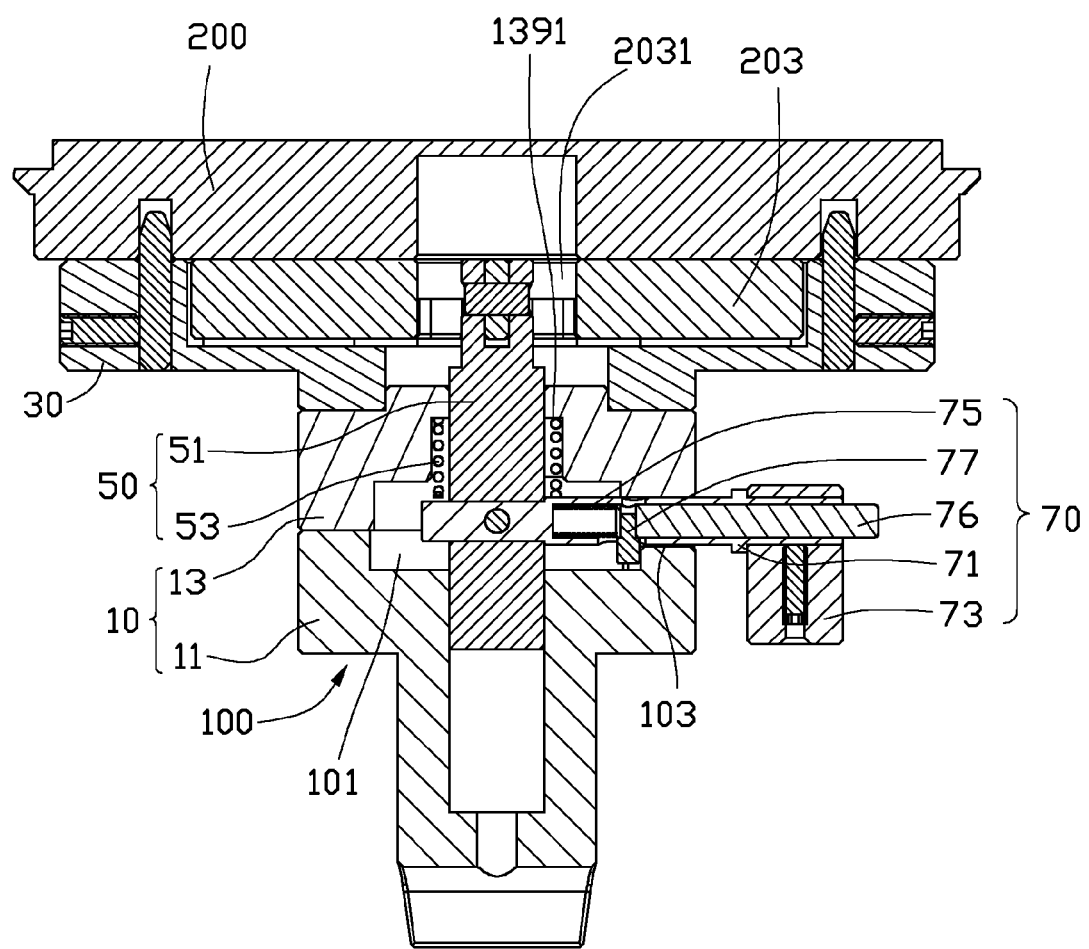
FIG. 6 is a cross sectional view of the instant clamping mechanism taken along line VI-VI of FIG. 1.

The cover 13 is in a disk shape and assembled to the second fixing portion 115. The cover 13 defines a second receiving groove 131, a second guiding groove 135, and a pair of positioning holes 136 at an end of the cover 13 facing the seating body 11. The second receiving groove 131 is defined in a middle of the end of the cover 13 corresponding to the first receiving groove 1151. Also referring to FIG. 6, the first receiving groove 1151 and the second receiving groove 131 cooperatively form a receiving chamber 101. The second guiding groove 135 is defined along a periphery of the cover 13 corresponding to the first guiding groove 116 which communicates with the second receiving groove 131. A central angle of the cover 13 subtended by the second guiding groove 135 is about 90 degrees. The second guiding groove 135 defines a second inclining surface 1351 at a bottom of the cover 13 parallel to the first inclining surface 1161. The first guiding groove 116 and the second guiding groove 135 cooperatively form the sliding groove 103. The sliding groove 103 is inclined toward the first fixing portion 113, and includes a releasing end 1031 and a latching end 1033 (see FIG. 2) opposite to the releasing end 1031. The releasing end 1031 is located away from the first fixing portion 113, and the latching end 1033 is located adjacent to the first fixing portion 113. An axial distance within the base seat 10 is defined from the releasing end 1031 to the latching end 1033. The latching groove 119 is defined on the releasing end 1031. The positioning holes 136 are arranged along a periphery of the cover 13 for receiving the posts 1157. The cover 13 further includes a positioning support 137 at an end thereof away from the seating body 11 and defines a stepped hole 139 on a bottom of the second receiving groove 131. The stepped hole 139 cuts through the positioning support 137 and forms an annular resisting surface 1391 (see FIG. 6) in a middle portion thereof.

The supporting member 30 is assembled to the cover 13, and receives the positioning support 137. The supporting member 30 is substantially rectangular, and defines an accommodating groove 31 in a middle portion thereof. The accommodating groove 31 is rectangular. The supporting member 30 further defines a guiding hole 33 at a bottom of the accommodating groove 31 and includes a pair of position protrusions 35 arranged at opposite ends of the accommodating groove 31 for positioning the workpiece 200. The positioning support 137 is received in the guiding hole 33.

The clamping assembly 50 includes a clamping rod 51, and a resilient member 53 sleeved on an end of the clamping rod 51. The clamping rod 51 extends through the inserting hole 118 and the stepped hole 139, and extends out from the stepped hole 139 to connect with a clamping insert 513. The clamping rod 51 radially defines a fixing hole 515 at a middle portion thereof. The resilient member 53 is received in the stepped hole 139 of the cover 13 and resists against the annular resisting surface 1391.

An end of the handle assembly 70 extends into the sliding groove 103 and the fixing hole 515, and is fixed in the clamping rod 51, the other end of the handle assembly 70 extends out of the base seat 10. The resilient member 53 resists between the annular resisting surface 1391 and the handle assembly 70. The handle assembly 70 includes a handle rod 71, an operating member 73, an elastic member 75, a sliding rod 76, and a latching member 77. The handle rod 71 includes a first mounting portion 711 and a second mounting portion 713 coaxial with the first mounting portion 711. The first mounting portion 711 has a diameter less than that of the second mounting portion 713. The first mounting portion 711 is received in the receiving chamber 101 and assembled into the fixing hole 515. The second mounting portion 713 is a hollow cylindrical shell exposed from the sliding groove 103, and radially defines a movable hole 7131 thereon adjacent to the first mounting portion 711. The operating member 73 is assembled to an end of the second mounting portion 713 away from the first mounting portion 711, to favor the operator. The elastic member 75 is received in the second mounting portion 713 and resists the first mounting portion 711. The sliding rod 76 is slidably received in the second mounting portion 713 and resists the elastic member 75 toward the first mounting portion 711. An end of the sliding rod 76 extends out of the second mounting portion 713. The latching member 77 is mounted on the end of the sliding rod 76 adjacent to the elastic member 75, and is exposed out of the movable hole 7131. When the handle assembly 70 is rotated to arrive at the latching end 1033, the latching member 77 latches in the latching groove 119 of the seating body 11. In the embodiment, the clamping rod 51 can be rotated about 90 degrees by the handle assembly 70.

In assembly, the cover 13 is assembled to the supporting member 30. The clamping rod 51 extends through the stepped hole 139. The clamping insert 513 is assembled to the end of the clamping rod 51 extending out from the stepped hole 139. The resilient member 53 is sleeved on the clamping rod 51. The elastic member 75 and the sliding rod 76 are received in the second mounting portion 713 in that order. The latching member 77 is assembled into the sliding rod 76 and exposed out of the movable hole 7131. The operating member 73 is sleeved on the second mounting portion 713. The first mounting portion 711 extends through the fixing hole 515 and is fixed to the clamping rod 51. The seating body 11 is assembled to the cover 13, and the end of the clamping rod 51 away from the cover 13 is assembled into the inserting hole 118. The first receiving groove 1151 and the second receiving groove 131 cooperatively form the receiving chamber 101, the first guiding groove 116 and the second guiding groove 135 form the sliding groove 103.

Referring to FIG. 3 again, the workpiece 200 includes a base body 201 and a mounting block 203 assembled to the base body 201. The mounting block 203 is substantially rectangular and has a shape and size corresponding to those of the accommodating groove 31. The mounting block 203 defines a mounting groove 2031 facing the base body 201 and a mounting hole 2033 on a bottom of the mounting groove 2031. The mounting hole 2033 is substantially in a strip shape and extends longitudinally along the mounting block 203.

In use, the first fixing portion 113 of the seating body 10 is fixed to the machine support. The handle assembly 70 is located at the releasing end 1031 of the sliding groove 103. The mounting block 203 is received in the accommodating groove 31. The clamping insert 513 extends out of the mounting hole 2033. The operating member 73 is pushed and the handle assembly 70 is rotated from the releasing end 1031 to the latching end 1033. The clamping rod 51 is rotated by the handle assembly 70 to rotate about 90 degrees. In the rotating process thereof, the clamping rod 51 also moves axially within the base seat 10 away from the supporting member 30, thereby driving the clamping insert 513 to resist a bottom of the mounting groove 2031. The latching member 77 is resisted by the elastic member 75, and latches into the latching groove 119, such that the workpiece 200 is clamped by the instant clamping mechanism 100. When releasing the workpiece 200 by the instant clamping mechanism 100, a force is applied to the sliding rod 76 to push the latching member 77 toward the receiving chamber 101, thereby detaching the latching member 77 from the latching groove 119. The handle assembly 70 is then rotated to the releasing end 1031, the clamping rod 51 is rotated by the handle assembly 70 and drives the clamping insert 513 to be aligned to the mounting hole 2033. Then the clamping insert 513 is pulled out of the mounting block 203 through the mounting hole 2033 to release the workpiece 200.

The sliding groove 103 may be formed on the seating body 11 or the cover 13. The shape of the sliding groove 103 may be spiral. The base seat 10 may be integrally formed with the sliding groove 103 defined at a periphery thereof. When the handle assembly 70 is held on the latching end 1033 by a sufficient amount of frictional forces, the latching groove 119, the sliding rod 76, the elastic member 75, and the latching member 77 may be omitted, respectively.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An instant clamping mechanism, comprising:
   a supporting member for receiving a workpiece;
   a base seat assembled to the supporting member and defining a sliding groove, the sliding groove comprising a releasing end and a latching end opposite to the releasing end, an axial distance within the base seat being defined from the latching end to the releasing end, the releasing end being adjacent to the supporting member, and the latching end being away from the supporting member;
   a clamping assembly extending through the base seat and the supporting member, and partially exposing out from the supporting member for clamping the workpiece; and
   a handle assembly extending into the sliding groove and partially exposing out from the base seat, wherein the handle assembly is non-rotatably connected to the clamping assembly, and the handle assembly is capable of sliding from the releasing end to the latching end to move awa2 from the supporting member, thus the clamping assembly is rotated by the handle assembly, and moves along the axial direction of the base seat away from the supporting member with the handle assembly in the rotating process, thereby clamping the workpiece on the supporting member.

2. The instant clamping mechanism of claim 1, wherein the base seat further comprises a seating body and a cover assembled to the seating body, the seating body defines a first guiding groove along a periphery of an end thereof, the cover defines a second guiding groove along a periphery at an end thereof, the first guiding groove and the second guiding groove cooperatively forms the sliding groove, an end of the cover away from the second guiding groove is connected to the supporting member.

3. The instant clamping mechanism of claim 2, wherein the seating body defines a first receiving groove thereon, the first guiding groove communicates with the first receiving groove, the cover defines a second receiving groove thereon, the second guiding groove communicates with the second receiving groove, the first receiving groove and the second receiving groove cooperatively form a receiving chamber communicating with the sliding groove, the handle assembly is partially received in the receiving chamber.

4. The instant clamping mechanism of claim 3, wherein the handle assembly comprises a handle rod, an elastic member, a sliding rod, and a latching member, the handle rod is non-rotatably assembled to the clamping assembly and partially exposed out of the base seat, the sliding rod is slidably received in the handle rod, the elastic member is received in the handle rod and resisted between the handle rod and the sliding rod, the handle rod radially defines a movable hole thereon adjacent to the clamping assembly, the latching member is assembled to the sliding rod and extending through the movable hole, the first guiding groove defines a latching groove at a bottom thereof, the latching member is configured for latching with the latching groove.

5. The instant clamping mechanism of claim 4, wherein the handle assembly further comprises an operating member, the operating member is sleeved on an end of the handle rod away from the clamping assembly.

6. The instant clamping mechanism of claim 3, wherein the clamping assembly comprises a clamping rod and a resilient member sleeved on an end of the clamping rod, the clamping rod and the resilient member are received in the receiving chamber, the resilient member is resisted between the cover and the handle assembly.

7. The instant clamping mechanism of claim 6, wherein the cover comprises a positioning support at an end thereof away from the seating body and defines a stepped hole on a bottom of the second receiving groove, the stepped hole cuts through the positioning support and forms an annular resisting surface, the resilient member is partially received in the stepped hole and resists the annular resisting surface.

8. The instant clamping mechanism of claim 6, wherein the clamping assembly further comprises a clamping insert assembled to the clamping rod, the clamping insert is protruded out of the supporting member for clamping the workpiece.

9. The instant clamping mechanism of claim 3, wherein the seating body comprises a pair of posts symmetrically arranged at the periphery thereof, the first guiding groove is recessed from the periphery of the seating body and located between the pair of posts, the cover further defines a pair of positioning holes along the periphery thereof, the second guiding groove is recessed from the periphery of the cover and located between the pair of positioning holes, the pair of posts is respectively received in the pair of positioning holes, thereby assembling the cover to the seating body.

10. The instant clamping mechanism of claim 1, wherein the base seat comprises a positioning support at an end facing the supporting member, the supporting member defines an accommodating groove thereon for receiving the positioning support to hold the base seat.

11. An instant clamping mechanism, comprising:
a supporting member;
a base seat assembled to the supporting member and defining a receiving chamber therein and a sliding groove communicating with the receiving chamber, the sliding groove comprising a releasing end and a latching end opposite to the releasing end, an axial distance within the base seat being defined from the latching end to the releasing end, the releasing end being adjacent to the supporting member, and the latching end being away from the supporting member;
a clamping assembly received in the receiving chamber and extending through the base seat and the supporting member along an axial direction of the base seat, the clamping assembly partially exposing out from the supporting member for clamping the workpiece; and
a handle assembly extending into the sliding groove along an radial direction of the base seat and partially exposing out of the base seat, wherein the handle assembly is non-rotatably connected to the clamping assembly, and the handle assembly is capable of sliding between the releasing end and the latching end to move away from or toward the supporting member, thus the clamping assembly is rotated by the handle assembly, and moves along the axial direction of the base seat with the handle assembly in the rotating process.

12. The instant clamping mechanism of claim 11, wherein the base seat comprises a seating body and a cover assembled to the seating body, the seating body defines a first guiding groove along a periphery of an end thereof, the cover defines a second guiding groove along a periphery at an end thereof, the first guiding groove and the second guiding groove cooperatively forms the sliding groove, an end of the cover away from the second guiding groove is connected to the supporting member.

13. The instant clamping mechanism of claim 12, wherein the seating body defines a first receiving groove thereon, the first guiding groove communicates with the first receiving groove, the cover defines a second receiving groove thereon, the second guiding groove communicates with the second receiving groove, the first receiving groove and the second receiving groove cooperatively form the receiving chamber communicating with the sliding groove, the handle assembly is partially received in the receiving chamber.

14. The instant clamping mechanism of claim 13, wherein the handle assembly comprises a handle rod, an elastic member, a sliding rod, and a latching member, the handle rod is non-rotatably assembled to the clamping assembly and partially exposed out of the base seat, the sliding rod is slidably received in the handle rod, the elastic member is received in the handle rod and resisted between the handle rod and the sliding rod, the handle rod radially defines a movable hole thereon adjacent to the clamping assembly, the latching member is assembled to the sliding rod and extending through the movable hole, the first guiding groove defines a latching groove at a bottom thereof, the latching member is configured for latching with the latching groove.

15. The instant clamping mechanism of claim 14, wherein the handle assembly further comprises an operating member, the operating member is sleeved on an end of the handle rod away from the clamping assembly.

16. The instant clamping mechanism of claim 13, wherein the clamping assembly comprises a clamping rod and a resilient member sleeved on an end of the clamping rod, the clamping rod and the resilient member are received in the receiving chamber, the resilient member is resisted between the cover and the handle assembly.

17. The instant clamping mechanism of claim 16, wherein the cover comprises a positioning support at an end thereof away from the seating body and defines a stepped hole on a bottom of the second receiving groove, the stepped hole cuts through the positioning support and forms an annular resisting surface, the resilient member is partially received in the stepped hole and resists the annular resisting surface.

18. The instant clamping mechanism of claim 16, wherein the clamping assembly further comprises a clamping insert assembled to the clamping rod, the clamping insert is protruded out of the supporting member for clamping a workpiece.

19. The instant clamping mechanism of claim 13, wherein the seating body comprises a pair of posts symmetrically arranged at the periphery thereof, the first guiding groove is recessed from the periphery of the seating body and located between the pair of posts, the cover further defines a pair of positioning holes along the periphery thereof, the second guiding groove is recessed from the periphery of the cover and located between the pair of positioning holes, the pair of posts is respectively received in the pair of positioning holes, thereby assembling the cover to the seating body.

20. The instant clamping mechanism of claim 11, wherein the base seat comprises a positioning support at an end facing the supporting member, the supporting member defines an accommodating groove thereon for receiving the positioning support to hold the base seat.

\* \* \* \* \*